United States Patent
Zhang

(10) Patent No.: US 12,349,030 B2
(45) Date of Patent: Jul. 1, 2025

(54) NETWORK ASSISTANCE INFORMATION PROVIDING METHOD AND APPARATUS, ELECTRONIC DEVICE, AND COMPUTER-READABLE STORAGE MEDIUM

(71) Applicant: Tencent Technology (Shenzhen) Company Limited, Guangdong (CN)

(72) Inventor: Zhuoyun Zhang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 290 days.

(21) Appl. No.: 17/702,263

(22) Filed: Mar. 23, 2022

(65) Prior Publication Data

US 2022/0217514 A1    Jul. 7, 2022

Related U.S. Application Data

(63) Continuation of application No. PCT/CN2021/079703, filed on Mar. 9, 2021.

(30) Foreign Application Priority Data

Apr. 24, 2020  (CN) .......................... 202010333450.8

(51) Int. Cl.
  *H04W 4/50*    (2018.01)
  *H04W 4/20*    (2018.01)
  *H04W 8/18*    (2009.01)
(52) U.S. Cl.
  CPC .............. *H04W 4/50* (2018.02); *H04W 4/20* (2013.01); *H04W 8/18* (2013.01)
(58) Field of Classification Search
  CPC ......... H04W 24/10; H04W 4/20; H04W 4/50; H04W 8/18
  See application file for complete search history.

(56) References Cited

U.S. PATENT DOCUMENTS

| 11,310,731 | B1* | 4/2022 | Feder | ..................... H04W 36/32 |
| 2008/0089285 | A1* | 4/2008 | Pirskanen | ............. H04L 1/1621 370/329 |

(Continued)

FOREIGN PATENT DOCUMENTS

WO     2020027639 A1    2/2020

OTHER PUBLICATIONS

Supplementary European Search Report issued Dec. 9, 2022 in Application No. 21793296.1, p. 1-8.

*Primary Examiner* — Stephen J Clawson
(74) *Attorney, Agent, or Firm* — ARENTFOX SCHIFF LLP

(57) ABSTRACT

In a network assistance information providing method, a first request message including a target protocol data unit session identity and unstructured request data is transmitted. The unstructured request data includes a user equipment analytics request prediction cell and is transmitted to a target application function corresponding to the target protocol data unit session identity based on a target analytics identity included in the user equipment analytics request prediction cell. The target application function is configured to transmit the user equipment analytics request prediction cell to a target network data analytics function. A first notification message including the target protocol data unit session identity and unstructured response data is received. The unstructured response data includes a user equipment analytics response cell which includes the network assistance information generated by the target network data analytics function in response to the user equipment analytics request prediction cell and includes the target analytics identity.

20 Claims, 7 Drawing Sheets

(56) References Cited

U.S. PATENT DOCUMENTS

| | | | |
|---|---|---|---|
| 2018/0262924 A1* | 9/2018 | Dao | H04W 24/08 |
| 2019/0253917 A1* | 8/2019 | Dao | H04W 28/0236 |
| 2020/0112907 A1* | 4/2020 | Dao | H04W 28/0268 |
| 2020/0252813 A1* | 8/2020 | Li | H04L 41/14 |
| 2021/0227450 A1* | 7/2021 | Chun | H04W 48/20 |
| 2021/0306887 A1* | 9/2021 | Kim | H04W 24/08 |
| 2021/0321320 A1* | 10/2021 | Chun | H04W 8/24 |
| 2021/0392574 A1* | 12/2021 | Tiwari | H04W 68/12 |
| 2022/0038946 A1* | 2/2022 | Kim | H04W 28/0284 |
| 2022/0109972 A1* | 4/2022 | Jeong | H04W 36/0033 |

* cited by examiner

NETWORK ASSISTANCE INFORMATION PROVIDING METHOD AND APPARATUS, ELECTRONIC DEVICE, AND COMPUTER-READABLE STORAGE MEDIUM

RELATED APPLICATIONS

This application is a continuation of International Application No. PCT/CN2021/079703, entitled "METHOD AND APPARATUS FOR PROVIDING NETWORK AUXILIARY INFORMATION, ELECTRONIC DEVICE, AND COMPUTER-READABLE STORAGE MEDIUM" and filed on Mar. 9, 2021, which claims priority to Chinese Patent Application No. 202010333450.8, entitled "NETWORK ASSISTANCE INFORMATION PROVIDING METHOD AND RELATED DEVICE" and filed on Apr. 24, 2020. The entire disclosures of the prior applications are hereby incorporated by reference in their entirety.

FIELD OF THE TECHNOLOGY

This application relates to the field of communication technologies, including to a network assistance information providing method and apparatus, an electronic device, and a computer-readable storage medium.

BACKGROUND OF THE DISCLOSURE

The 3rd generation partnership project (3GPP) standard protocol proposes the use of network assistance information to improve quality of experience (which is referred to as QoE for short, and refers to subjective feelings of a user on quality and performance of a device, a network, a system, an application, or a service) of a streaming media session. However, the existing standard does not specify how to provide the network assistance information to user equipment (UE).

Therefore, a new network assistance information providing method and apparatus, an electronic device, and a computer-readable storage medium are required.

Information disclosed in the background part is merely used for enhancing the understanding of the background of this disclosure.

SUMMARY

Embodiments of this disclosure provide a network assistance information providing method and apparatus, an electronic device, and a computer-readable storage medium, to provide network assistance information to user equipment, thereby improving quality of experience of streaming media sessions of the user equipment.

Other features and advantages of this disclosure become obvious through the following detailed descriptions, or may be partially learned through the practice of this disclosure.

An embodiment of this disclosure provides a network assistance information providing method. In the method, a first request message that includes a target protocol data unit session identity and unstructured request data is transmitted. The unstructured request data includes a user equipment analytics request prediction cell. The unstructured request data is transmitted to a target application function corresponding to the target protocol data unit session identity based on a target analytics identity included in the user equipment analytics request prediction cell. The target application function is configured to transmit the user equipment analytics request prediction cell to a target network data analytics function. A first notification message that includes the target protocol data unit session identity and unstructured response data is received. The unstructured response data includes a user equipment analytics response cell. The user equipment analytics response cell includes the network assistance information and the target analytics identity. The network assistance information is generated by the target network data analytics function in response to the user equipment analytics request prediction cell.

An embodiment of this disclosure provides a network assistance information providing method. In the method, unstructured request data is received from a first network exposure function. The unstructured request data includes a user equipment analytics request prediction cell. The user equipment analytics request prediction cell includes a target analytics identity and a target user equipment identity. A prediction request message is transmitted to a second network exposure function. The prediction request message includes the user equipment analytics request prediction cell. A second notification message is received from the second network exposure function that includes a user equipment analytics response cell. The user equipment analytics response cell includes the network assistance information and the target analytics identity. The network assistance information is generated by a target network data analytics function in response to the user equipment analytics request prediction cell. Unstructured response data that includes the user equipment analytics response cell is generated. Further, the unstructured response data is transmitted via the first network exposure function to target user equipment corresponding to the target user equipment identity.

An embodiment of this disclosure provides a network assistance information providing apparatus that includes processing circuitry. The processing circuitry is configured to transmit a first request message that includes a target protocol data unit session identity and unstructured request data. The unstructured request data includes a user equipment analytics request prediction cell. The unstructured request data is transmitted to a target application function corresponding to the target protocol data unit session identity based on a target analytics identity included in the user equipment analytics request prediction cell. The target application function is configured to transmit the user equipment analytics request prediction cell to a target network data analytics function. A first notification message that includes the target protocol data unit session identity and unstructured response data is received. The unstructured response data includes a user equipment analytics response cell. The user equipment analytics response cell includes the network assistance information and the target analytics identity. The network assistance information is generated by the target network data analytics function in response to the user equipment analytics request prediction cell An embodiment of this disclosure provides a network assistance information providing apparatus that includes processing circuitry. The processing circuitry is configured to receive unstructured request data from a first network exposure function. The unstructured request data includes a user equipment analytics request prediction cell. The user equipment analytics request prediction cell includes a target analytics identity and a target user equipment identity. The processing circuitry is configured to transmit a prediction request message to a second network exposure function. The prediction request message includes the user equipment analytics request prediction cell. A second notification message is received from the second network exposure function that includes a user equipment analytics response cell. The user equipment analytics response cell includes the network assistance information and the target analytics identity. The network assistance information is generated by a target network data analytics function in response to the user equipment analytics request prediction cell. The processing circuitry is configured to generate unstructured response data that includes the user equipment analytics response cell. Further, the processing circuitry is configured to transmit the unstructured response data via the first network exposure function to target user equipment corresponding to the target user equipment identity.

An embodiment of this disclosure provides a non-transitory computer-readable storage medium, storing instructions which when executed by a processor cause the processor to perform the network assistance information providing method according to any of the foregoing embodiments.

An embodiment of this disclosure provides an electronic device, including one or more processors; and a storage apparatus, configured to store one or more programs, the one or more programs, when executed by the one or more processors, causing the one or more processors to implement the network assistance information providing method according to any of the foregoing embodiments.

An embodiment of this disclosure further provides a computer program product or a computer program. The computer program product or the computer program includes computer instructions, the computer instructions being stored in a computer-readable storage medium. A processor of a computer device reads the computer instructions from the computer-readable storage medium and executes the computer instructions, to cause the computer device to perform any of the foregoing network assistance information providing method.

It is to be understood that the foregoing general descriptions and the following detailed descriptions are merely exemplary and explanatory, and are not intended to limit this disclosure.

BRIEF DESCRIPTION OF THE DRAWINGS

Accompanying drawings herein, which are incorporated into this specification and constitute a part of this specification, illustrate embodiments that conform to this disclosure, and are used for describing a principle of this disclosure together with this specification. The accompanying drawings in the following descriptions are merely some embodiments of this disclosure, and a person of ordinary skill in the art may further obtain other embodiments. In the accompanying drawings.

DESCRIPTION OF EMBODIMENTS

Exemplary implementations are described with reference to the accompanying drawings. However, the exemplary implementations can be implemented in various forms, and should not be construed as a limitation to examples described herein. Instead, the implementations are provided as examples to facilitate understanding by a person skilled in the art.

In addition, the described features, structures, or characteristics may be combined in one or more embodiments in any appropriate manner. In the following descriptions, more specific details are provided to provide a comprehensive understanding of the embodiments of this disclosure. However, a person skilled in the art should understand that, the technical solutions in this disclosure may be implemented without one or more of the specific details, or another method, unit, apparatus, or step may be used. In other cases, well-known methods, apparatuses, implementations, or operations are not shown or described in detail, to avoid obscuring aspects of this disclosure.

Block diagrams shown in the accompanying drawings are merely functional entities and do not necessarily correspond to physically independent entities. In other words, the functional entities may be implemented in a software form, or may be implemented in one or more hardware modules or integrated circuits, or may be implemented in different networks and/or processor apparatuses and/or microcontroller apparatuses.

Flowcharts shown in the accompanying drawings are merely exemplary descriptions, do not necessarily include all content and operations/steps, and do not need to be performed in the described orders. For example, some operations/steps may be further divided, while some operations/steps may be combined or partially combined. Therefore, an actual execution order may change according to an actual situation.

Figure 1:
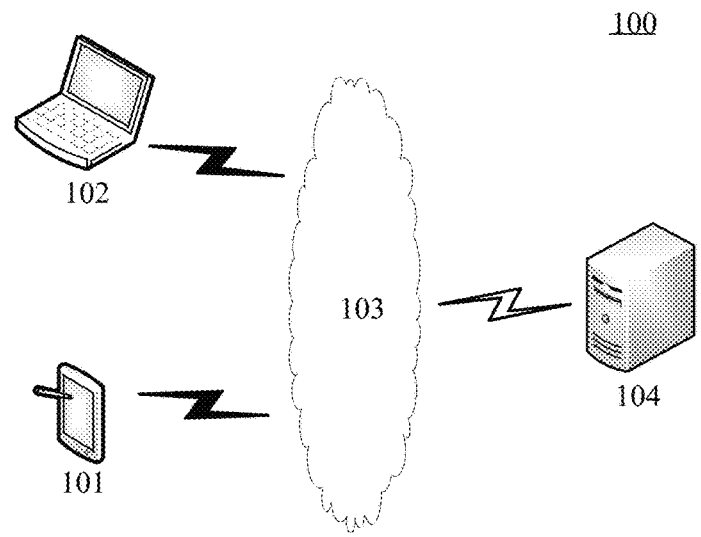
FIG. 1 is a schematic diagram of an exemplary system architecture to which a network assistance information providing method or apparatus according to an embodiment of this disclosure is applicable.

FIG. 1 is a schematic diagram of an exemplary system architecture 100 to which a network assistance information providing method or apparatus according to an embodiment of this disclosure is applicable.

As shown in FIG. 1, the system architecture 100 may include user equipment 101 and 102, a network 103, and a server 104. The network 103 is a medium configured to provide a communication link between the user equipment 101 and 102 and the server 104. The network 103 may include various connection types such as a wired or wireless communication link or a fiber optic cable.

A user may interact with the server 104 through the network 103 by using the user equipment 101 and 102, to receive or transmit messages. The user equipment 101 and 102 may be various electronic devices with a display screen and supporting access to the network 103, including, but not limited to, a smartphone, a tablet computer, a laptop computer, a desktop computer, a wearable device, a virtual reality device, a smart household device, or the like.

The user equipment 101 and 102 may, for example, transmit a first request message, the first request message carrying a target protocol data unit session identity and unstructured request data, the unstructured request data including a user equipment analytics request prediction cell, the user equipment analytics request prediction cell including a target analytics identity to help transmit the unstructured request data to a target application function corresponding to the target protocol data unit session identity, the target application function transmitting the user equipment analytics request prediction cell to a target network data analytics function. The user equipment 101 and 102 may further receive a first notification message, the first notification message carrying the target protocol data unit session identity and unstructured response data, the unstructured response data including a user equipment analytics response cell, the user equipment analytics response cell including network assistance information and the target analytics identity, the network assistance information being generated by the target network data analytics function in response to the user equipment analytics request prediction cell.

The server 104 may be a server configured to provide various services, for example, a backend administration server supporting an apparatus where the user performs operations by using the user equipment 101 and 102. The backend administration server may perform processing such as analysis on data such as received requests, and feed back processing results to the user equipment.

It is to be understood that quantities of the user equipment, the networks, and the servers in FIG. 1 are merely exemplary. There may be any quantity of user equipment, networks, and servers according to actual requirements.

The server 104 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The equipment may be a smartphone, a tablet computer, a notebook computer, a desktop computer, a smart speaker, a smartwatch, or the like, but is not limited thereto. The equipment and the server may be directly or indirectly connected in a wired or wireless communication manner. This is not limited in this embodiment of this disclosure.

Figure 2:
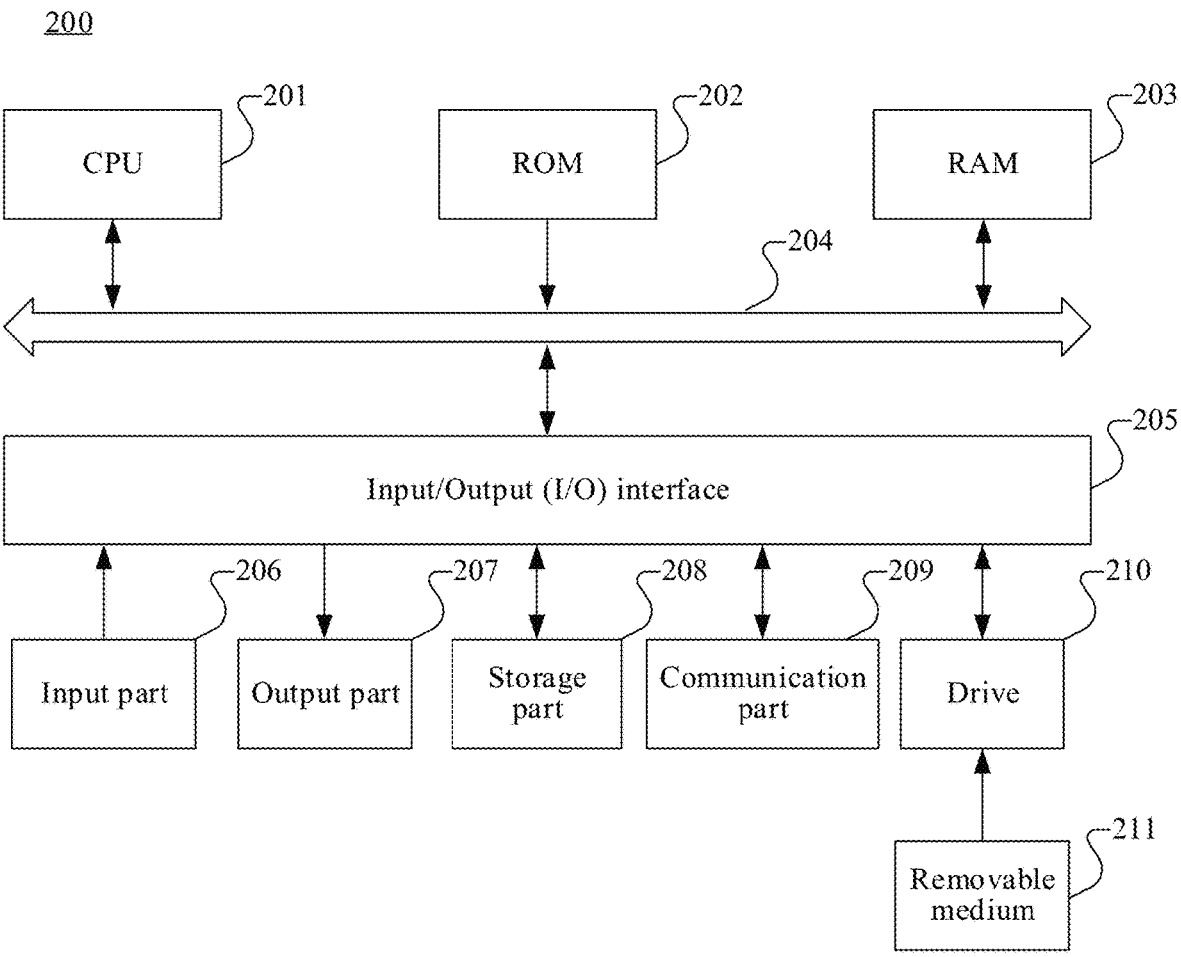
FIG. 2 is a schematic structural diagram of an exemplary electronic device adapted to implement an embodiment of this disclosure.

FIG. 2 is a schematic structural diagram of a computer system 200 corresponding to an exemplary electronic device adapted to implement an embodiment of this disclosure. For example, the electronic device is the user equipment 101 or 102, or the server 104 shown in FIG. 1.

The computer system 200 shown in FIG. 2 is merely an example, and does not constitute any limitation to functions and a use range of the embodiments of this disclosure.

As shown in FIG. 2, the computer system 200 includes processing circuitry such as a central processing unit (CPU) 201. The CPU can perform various appropriate actions and processing according to a program stored in a read-only memory (ROM) 202 or a program loaded from a storage part 208 into a random access memory (RAM) 203. The RAM 203 further stores various programs and data required for system operations. The CPU 201, the ROM 202, and the RAM 203 are connected to each other by using a bus 204. An input/output (I/O) interface 205 is also connected to the bus 204.

The following parts are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk, or the like; and a communication part 209 including a network interface card such as a local area network (LAN) card or a modem. The communication part 209 performs communication processing by using a network such as the Internet. A drive 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

Particularly, according to an embodiment of this disclosure, the processes described in the following by referring to the flowcharts may be implemented as computer software programs. For example, an embodiment of this disclosure includes a computer program product, including a computer program carried on a computer-readable storage medium such as a non-transitory computer-readable storage medium, and the computer program includes program code used for performing the methods shown in the flowcharts. In such an embodiment, by using the communication part 209, the computer program may be downloaded and installed from a network, and/or installed from the removable medium 211. When the computer program is executed by the CPU 201, various functions defined in the method and/or apparatus of this disclosure are executed.

The computer-readable storage medium in this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include, but is not limited to: an electrical connection having one or more wires, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In this disclosure, the computer-readable storage medium may be non-transitory or any tangible medium including or storing a program, and the program may be used by or used in combination with an instruction execution system, an apparatus, or a device. In this disclosure, a computer-readable signal medium may include a data signal included in a baseband or propagated as a part of a carrier wave, the data signal carrying computer-readable program code. The propagated data signal may be in a plurality of forms, including but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code included in the computer-readable storage medium may be transmitted by using any appropriate medium, including but not limited to: a wireless medium, a wire, an optical cable, a radio frequency (RF) medium, or any appropriate combination thereof.

The flowcharts and block diagrams in the accompanying drawings show architectures, functions, and operations that may be implemented for the method, the apparatus, and the computer program product according to the embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Involved units described in the embodiments of this disclosure may be implemented in a software manner, may be implemented in a hardware manner, or a combination thereof, and the described units may also be set in a processor. Names of the units do not constitute a limitation to the units in a specific case.

According to another aspect, this disclosure further provides a computer-readable storage medium. The computer-readable storage medium may be included in the electronic device described in the foregoing embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement steps shown in FIG. 3 or FIG. 7.

A cloud technology can refer to a hosting technology that unifies a series of resources such as hardware, software, and networks in a wide area network or a local area network to implement computing, storage, processing, and sharing of data. For example, the cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology has become an important support. A background service of a technical network system requires a large amount of computing and storage resources, such as a video website, an image website, and more portal websites. As the Internet industry is highly developed and applied, each article may have an identifier in the future and needs to be transmitted to a background system for logical processing. Data at different levels is separately processed, and data in various industries requires strong system support, which can be implemented by using cloud computing.

Big data can refer to a data set that cannot be captured, managed, and processed by using a conventional software tool within a specific time range, and can refer to massive, high-growth, and diversified information assets have stronger decision-making, insight discovery, and process optimization capability only in a new processing mode. With the advent of the cloud era, big data has attracted more attention, and big data requires special technologies to effectively process massive data with a tolerance elapsed time. A technology adapted to big data includes a massively parallel processing database, a data-mining distributed file system, a distributed database, a cloud computing platform, the Internet, and an extensible storage system.

First, some terms used in the embodiments of this disclosure are described.

A network exposure function (NEF) can refer to a control plane network element of a 5G core network, implementing exposure of a capability of a 5G network to a capability of an application server. By using the NEF, internal information of the 5G network, for example, equipment position information, equipment roaming state, and the like may be provided to the application server.

An access network can refer to an implementation system including a series of transmission entities between a core network and an equipment interface in a mobile communication system and used for providing a required transport carrying capability for transporting telecommunication services. The AN herein may refer to at least one access network of a radio access network (RAN) connected to the 5G core network and including a 4G base station or a 5G base station and/or a non-3rd generation partnership project (non-3GPP) access network.

The RAN is a part of the mobile communication system. The RAN is located between a device (e.g., a mobile phone, a computer, or any machine remotely controlled) and the core network (CN), and provides a wireless communication between the device and the CN.

A network function (NF) can refer to a 3GPP-adopted or 3GPP-defined network processing function in a network, including a defined functional behavior and a 3GPP-defined interface.

An access and mobility management function (AMF) is mainly responsible for access authentication, authorization, and mobility management, and may provide transmission for a session management (SM) message between user equipment (UE) and a session management function (SMF).

The SMF is mainly responsible for session management and Internet Protocol (IP) address assignment. In a single example of the SMF, all or some of the SMFs may be supported, including: session management, for example, session establishment, modification, and release, and channel maintenance between a user plane function (UPF) and the AN; IP address assignment and management (including optional authorization) of the UE; and configuring flow control of the UPF, routing traffic to a correct destination, and the like.

The UPF establishes a protocol data unit (PDU) session to transmit a data packet of a user plane, and is responsible for routing, forwarding, and policy execution of packet data. In a single example of the UPF, all or some of the UPFs may be supported, including: packet routing and forwarding (e.g., supporting an uplink classifier (ULCL) to offload a service flow to a local data network, and supporting a branch point (BP) to support a multi-homing PDU session).

An NF repository function (NRF) is a functional network element that may support a service discovery function. A network element discovery request is received from a network element functional entity, and network element entity information to be "discovered" is fed back. In addition, the network element is further responsible for maintaining information about available network function entities and services respectively supported by the entities. Such a discovery process is triggered by a network element function by providing a type of the NF or specific services that are expected to be discovered by the NRF, and the NRF provides an example of the NF, or an IP address on which the NF provides services, or a fully qualified domain name (FQDN), or a corresponding identity.

An application function (AF) can interact with the 5G core network to provide services, for example, to support the following functions: (1) affecting application of service routing; (2) being able to access network exposure; and (3) interacting with a policy framework to perform policy control.

A network data analytics function (NWDAF) can represent a network data prediction and analytics function managed by an operator. The NWDAF can provide on-demand network data analysis for the NF.

A framework for live uplink streaming (FLUS) can be used to describe an architecture of related entities that provide uplink streaming services.

A date network name (DNN) can refer to a name of a data network.

Single network slice selection assistance information (S-NSSAI) can refer to assistance information about single network slice selection.

A policy control function (PCF) can refer to a function of controlling a policy.

Streaming media may include the following types: video, audio, text, metadata, or the like.

Figure 3:
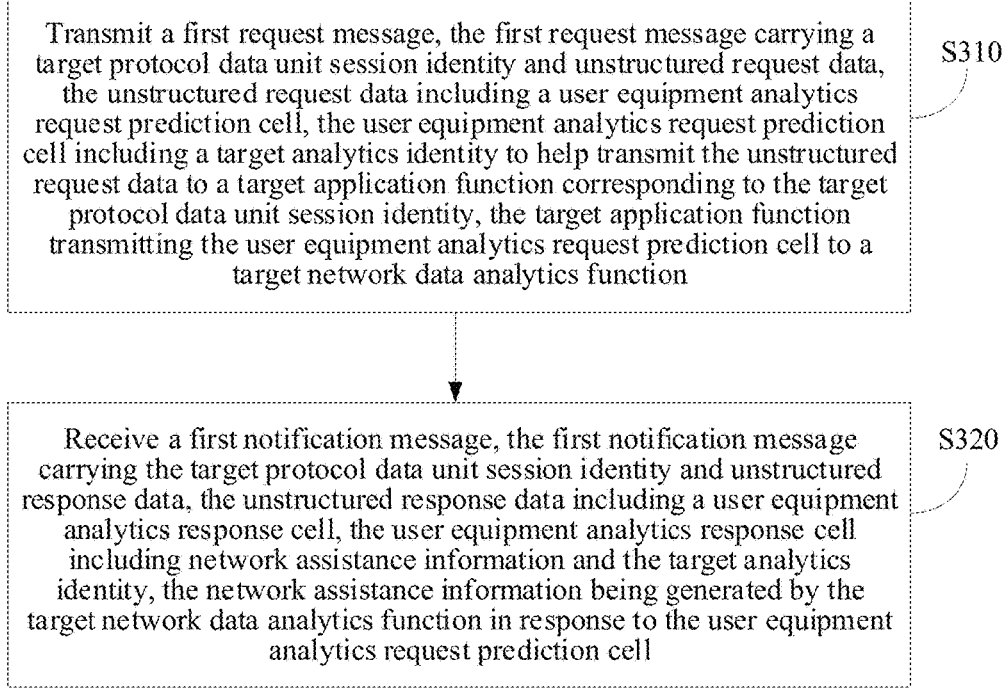
FIG. 3 is a schematic flowchart of a network assistance information providing method according to an embodiment of this disclosure.

FIG. 3 is a schematic flowchart of a network assistance information providing method according to an embodiment of this disclosure. In an embodiment of FIG. 3, the method may be implemented by a target UE. The target UE may be, for example, the user equipment 101 and 102 in the foregoing embodiment of FIG. 1, and this disclosure is not limited thereto. As shown in FIG. 3, the method provided in this embodiment of this disclosure may include the following steps:

In step S310, a first request message is transmitted, the first request message carrying a target protocol data unit session identity and unstructured request data, the unstructured request data including a user equipment analytics request prediction cell, the user equipment analytics request prediction cell including a target analytics identity to help transmit the unstructured request data to a target application function corresponding to the target protocol data unit session identity. The target application function transmits the user equipment analytics request prediction cell to a target network data analytics function.

In an exemplary embodiment, the user equipment analytics request prediction cell further includes a target user equipment identity, and the transmitting a first request message may include: putting the first request message in a target protocol data unit session establishment request message, and transmitting the target protocol data unit session establishment request message to an access and mobility management function; transmitting, by using the access and mobility management function, a second request message to a target session management function, the second request message including a subscription permanent identifier of target user equipment corresponding to the target user equipment identity, the target protocol data unit session identity, and the unstructured request data; transmitting, by using the target session management function, a third request message to a first network exposure function, the third request message including the subscription permanent identifier, the target protocol data unit session identity, and the unstructured request data; and transmitting, by using the first network exposure function, the unstructured request data to the target application function. For details, reference may be made to an embodiment of FIG. 5.

In an exemplary embodiment, the transmitting a first request message may include: transmitting the first request message to a target session management function on a target protocol data unit session corresponding to the target protocol data unit session identity; transmitting, by using the target session management function, a fourth request message to a first network exposure function, the fourth request message including the target protocol data unit session identity and the unstructured request data; and transmitting, by using the first network exposure function, a fifth request message to the target application function, the fifth request message including the target protocol data unit session identity and the unstructured request data. For details, reference may be made to an embodiment of FIG. 7.

In an exemplary embodiment, the target service flow identity may include at least one piece of information of Internet Protocol filter information and/or a fully qualified domain name, and a target protocol data unit session identity. The target service flow identity may further include a quality of service (QoS) flow identity (ID) when the target protocol data unit session identity includes the target protocol data unit session identity.

In an exemplary embodiment, the user equipment analytics request prediction cell may further include information about an area of interest.

In step S320, a first notification message is received, the first notification message carrying the target protocol data unit session identity and unstructured response data, the unstructured response data including a user equipment analytics response cell, the user equipment analytics response cell including network assistance information and the target analytics identity, the network assistance information being generated by the target network data analytics function in response to the user equipment analytics request prediction cell.

In an exemplary embodiment, the network assistance information may include a data transmission rate prediction value of a target service flow corresponding to the target service flow identity.

In an exemplary embodiment, the network assistance information may include a data packet latency prediction value of a target service flow corresponding to the target service flow identity.

In an exemplary embodiment, the user equipment analytics request prediction cell may further include a target analytics sub-identity. The network assistance information may be determined according to the target analytics identity and the target analytics sub-identity.

In an exemplary embodiment, the network assistance information may include at least one of a data transmission rate prediction value and a data packet latency prediction value of a target service flow corresponding to the target service flow identity when the target analytics identity is set as user equipment analytics, and the target analytics sub-identity is set as service experience.

In an exemplary embodiment, the network assistance information may include a data transmission rate prediction value of a target service flow corresponding to the target service flow identity when the target analytics identity is set as service experience or user equipment analytics, and the target analytics sub-identity is set as bitrate recommendation.

In an exemplary embodiment, the network assistance information may include a data packet latency prediction value of a target service flow corresponding to the target service flow identity when the target analytics identity is set as service experience or user equipment analytics, and the target analytics sub-identity is set as a latency.

In an exemplary embodiment, the network assistance information may include a data transmission rate prediction value and a data packet latency prediction value of a target service flow corresponding to the target service flow identity when the target analytics identity is set as service experience or user equipment analytics, and the target analytics sub-identity is set as bitrate recommendation and a latency.

In an exemplary embodiment, the user equipment analytics response cell may further include one or more of timestamp information, a valid time, a valid place, or a prediction confidence of the network assistance information.

According to the network assistance information providing method provided in this implementation of this disclosure, target user equipment transmits a first request message and carries a target protocol data unit session identity and unstructured request data in the first request message, the unstructured request data including a user equipment analytics request prediction cell carrying a target analytics identity, so that the unstructured request data may be transmitted to a target application function corresponding to the target protocol data unit session identity. Then the target application function may transmit the user equipment analytics request prediction cell to a target network data analytics function, and the target network data analytics function may generate network assistance information in response to the user equipment analytics request prediction cell. The target user equipment may obtain a user equipment analytics response cell including the network assistance information and the target analytics identity by receiving a first notification message including the target protocol data unit session identity and unstructured response data. In this way, the network assistance information is transmitted to the target UE, improving quality of experience (QoE) of streaming media sessions of the target UE.

The method provided in this embodiment of this disclosure is not limited to being adapted to uplink streaming media, and is alternatively adapted to downlink streaming media. The following embodiments are described by using the uplink streaming media as an example.

Figure 4:
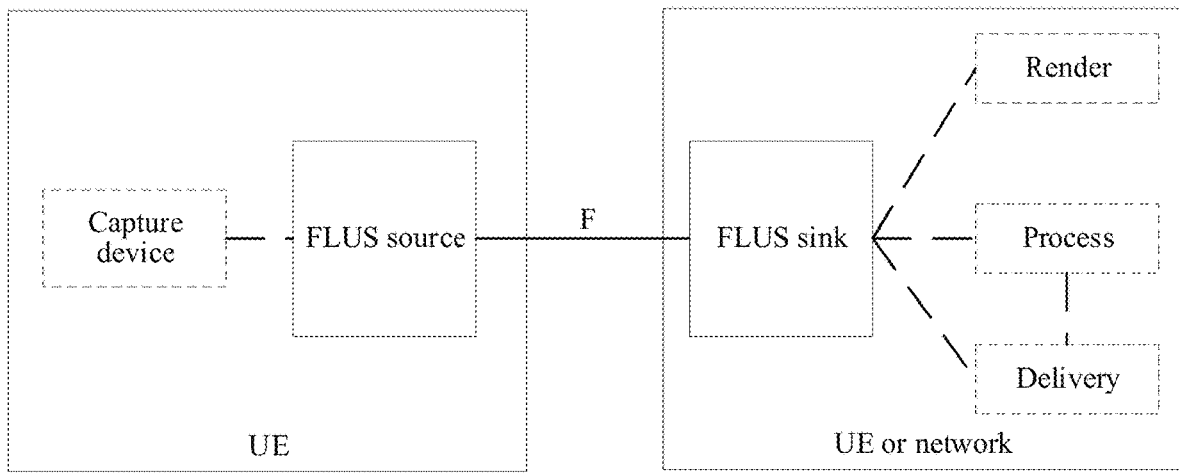
FIG. 4 is a schematic framework diagram of an exemplary framework for live uplink streaming (FLUS) to which an embodiment of this disclosure is applied.

FIG. 4 is a schematic framework diagram of an exemplary framework for live uplink streaming (FLUS) to which an embodiment of this disclosure is applied.

An uplink streaming media service architecture shown in FIG. 4 includes a FLUS source on UE (hereinafter referred to as target UE) side and a FLUS sink on another UE or a network. The FLUS source obtains media content from one or more capture devices. The capture devices may be components of the UE, or may be devices connected to the UE. The FLUS sink may be located on the another UE, or may alternatively be located on the network.

Uplink network assistance (UNA) is defined in a FLUS architecture. The uplink network assistance enables the FLUS source to improve quality of experience (QoE) of an uplink streaming media session, and the uplink network assistance is provided by a network assistance server (NAssS). The NAssS provides network assistance information by using a transmission path different from that of the uplink streaming media. Communication of the UNA is independent of communication paths of a media source and sink (F-U) and a control source and sink (F-C). Therefore, the communication of the UNA is performed on a path completely different from that of FLUS streaming media. The UNA is also not required to be perceived in the FLUS sink. The UNA provides a response message to the FLUS source based on a request of the FLUS source for the network assistance information. The UNA may provide the FLUS source with any one or two types of information:

First function: The NAssS indicates a most appropriate uplink streaming media transmission rate of the FLUS source within a future time period.

Second function: The NAssS indicates a temporary delivery boost function of the FLUS source, to resolve a risk that uplink transmission content may exceed an output buffer.

When an uplink network assistance session is activated, a client (in this embodiment of this disclosure, which refers to a functional component in the target UE, and is a client specially used for streaming media processing) may transmit an uplink network assistance information request before transmitting a next segment of uplink streaming media content to the FLUS sink. The uplink network assistance information request includes single logic signaling interaction. The interaction may activate the first function mentioned above, or may simultaneously activate both functions mentioned above. The second function is used only when the FLUS source is authorized to be connected to the delivery boost function. When delivery boost is not required for the client, the NassS may delete the second function in a message responded to the FLUS source.

In this embodiment of this disclosure, the NAssS is implemented by using the application function (AF) in the network, to provide the uplink transmission rate or the delivery boost function to the FLUS source.

However, in existing related standards, an interaction process of the FLUS source and the AF, that is, how the AF transmits the uplink network assistance information to the FLUS source is not defined.

In this embodiment of this disclosure, the NWDAF may obtain service experience data/service data information within a previous time period by performing functional analysis, or may obtain service experience data/service data information within a specific future time period by performing analysis.

In this embodiment of this disclosure, the service experience data/service data information can be obtained by the NWDAF includes at least one of the following: a data transmission rate prediction value of a specific QoS flow (which is referred to as a target service flow), an uplink or downlink data packet latency prediction value of a specific QoS flow, or the like.

In this embodiment of this disclosure, the specific data transmission rate prediction value of the specific QoS flow predicted by the NWDAF refers to a prediction value of a data transmission rate of the QoS flow within a specific future time period, which may be used for assisting the FLUS source in setting the uplink streaming media transmission rate. The data packet latency prediction value of the specific QoS flow predicted by the NWDAF refers to a prediction value of a data packet latency of the QoS flow within a specific future time period, which may be used for adjusting parameters related to the streaming media, for example, used for assisting the FLUS source in setting an appropriate buffer value (which is used for indicating a size of an output buffer of to-be-transmitted streaming media), or adjusting an encoding algorithm to match a state of the network. Therefore, in this embodiment of this disclosure, the service data information (including the uplink data transmission rate prediction value and/or the data packet latency prediction value) predicted by the NWDAF is proposed to be transmitted to the FLUS source.

Specifically, the FLUS source may directly set the received data transmission rate prediction value of the QoS flow as a streaming media transmission rate of the to-be-transmitted streaming media within a future time period, and may alternatively assist in setting the streaming media transmission rate of the to-be-transmitted streaming media within the future time period by using the received data transmission rate prediction value. This is not limited in this disclosure.

It is to be understood that, when the method provided in this embodiment of this disclosure is applicable to the downlink streaming media, the target UE may be the another UE on which the FLUS sink is located; and in this case, the FLUS sink may directly set the received data transmission rate prediction value of the QoS flow as a streaming media transmission rate of to-be-received streaming media within a future time period, and may alternatively assist in setting the streaming media transmission rate of the to-be-received streaming media within the future time period by using the received data transmission rate prediction value. This is not limited in this disclosure.

In this embodiment of this disclosure, when the data packet latency prediction value of the received QoS flow is relatively large, it indicates that the network is in a relatively poor state. In this case, the parameters related to the streaming media may be adjusted, for example, a larger buffer value is set to buffer the to-be-transmitted streaming media to prevent data packet loss due to the poor network state. When the data packet latency prediction value of the received QoS flow is relatively small, it indicates that the network is in a relatively good state, and a smaller buffer value may be set to cache the to-be-transmitted streaming media.

In this embodiment of this disclosure, the target UE may be pre-configured with a plurality of optional encoding algorithms (where a type and a quantity of specific encoding algorithms may be set according to an actual application scenario, and this is not limited in this disclosure) for the to-be-transmitted streaming media, or different parameter values are configured for the encoding algorithms. When the data packet latency prediction value of the received QoS flow is relatively large, it indicates that the network is in the relatively poor state. In this case, related setting or parameters of the streaming media may be adjusted, for example, an encoding algorithm having smaller encoding complexity and lower encoding performance is selected as a target encoding algorithm of the to-be-transmitted streaming media to match the network state in this case. When the data packet latency prediction value of the received QoS flow is relatively small, it indicates that the network is in the relatively good state. In this case, related setting or parameters of the streaming media may be adjusted, for example, an encoding algorithm having larger encoding complexity and higher encoding performance is selected as a target encoding algorithm of the to-be-transmitted streaming media to match the network state in this case.

In this embodiment of this disclosure, prediction information in the NWDAF may be exposed to the AF. Specifically, the target UE may trigger establishment of a control plane transmission path to a target AF, and transmit a data analytics and prediction request (included in the unstructured request data) transmitted by the target UE to the target AF. The target AF may sign up, according to the data analytics and prediction request of the target UE, from a target NWDAF to obtain required prediction information (which is the network assistance information in this embodiment of this disclosure). After receiving network assistance information analyzed and predicted by the target NWDAF, the target AF may transmit the network assistance information to the target UE by using the control plane transmission path.

In this embodiment of this disclosure, a UE analytic container (herein corresponding to a user equipment analytics request prediction cell) is defined, the UE analytic container corresponding to the user equipment analytics request prediction cell includes specific parameters of data analytics and prediction requested by the target UE, and UE analytic container corresponding to the user equipment analytics request prediction cell may be transmitted to the target AF on the control plane transmission path established by the target UE. The target AF encapsulates the network assistance information analyzed and predicted by the target NWDAF into the UE analytic container (herein corresponding to a user equipment analytics response cell), and transmits the network assistance information to the target UE on the control plane transmission path established by the target UE.

In this embodiment of this disclosure, the user equipment analytics request prediction cell refers to a packaged message body, that is, a data package set. Parameters of the data analytics and prediction to be requested by the UE are packaged into a container. The parameters are not parsed by an intermediate network element (e.g., the RAN, the AMF, the SMF, or the NEF) and are directly and transparently transmitted to a network element (e.g., the AF) on which the parameters are parsed. The user equipment analytics response cell refers to a packaged message body, that is, a data package set. Results of the data analytics and prediction in response to the user equipment analytics request prediction cell to be received by the UE are packaged into the container. The results are not parsed by the intermediate network element and are directly and transparently transmitted to the target UE on which the results are parsed.

Figure 5:
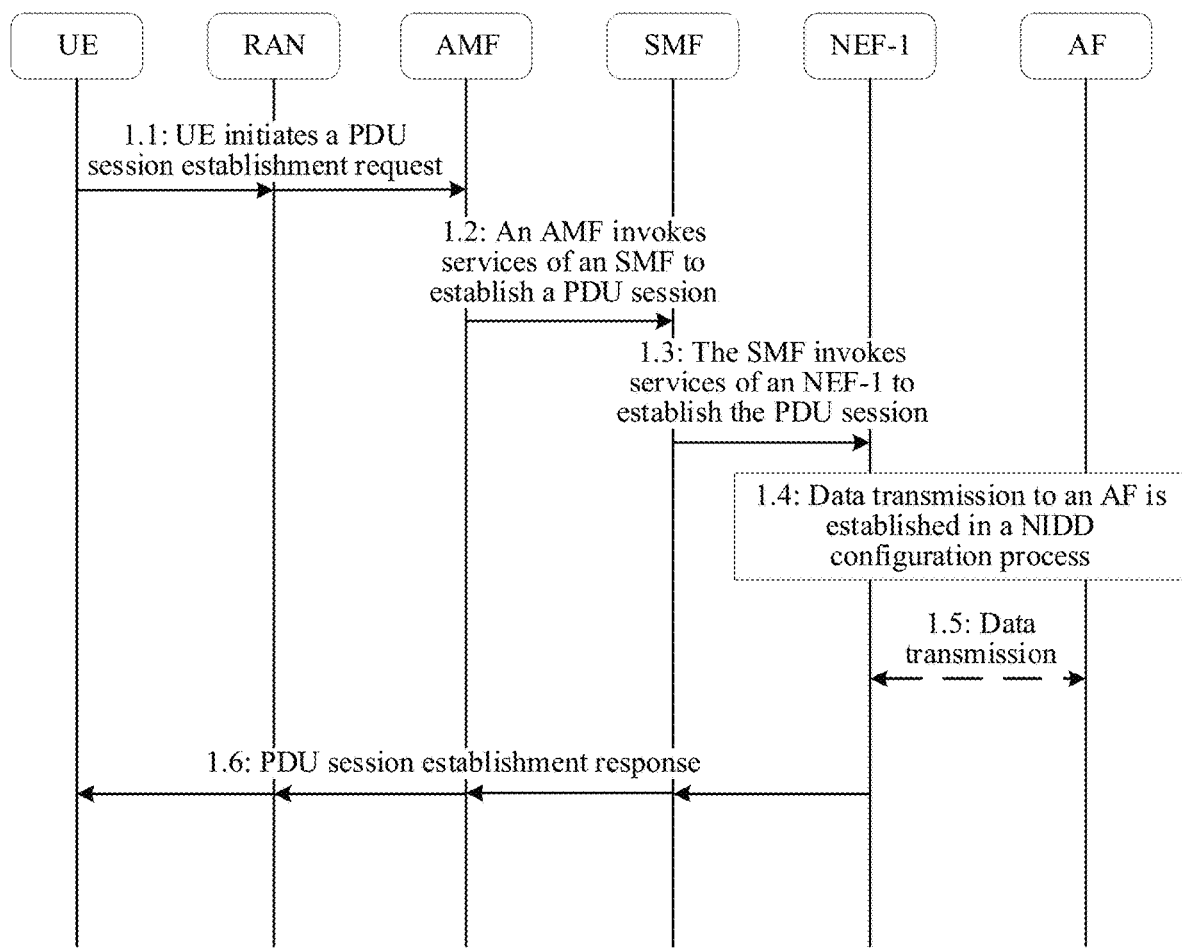
FIG. 5 is a schematic diagram of a network assistance information providing method according to another embodiment of this disclosure.

In an embodiment of FIG. 5, the data analytics and prediction request transmitted by the target UE may be included in a PDU session establishment process. A specific service flowchart is shown in FIG. 5, and the process may include the following steps:

In step 1.1, the target UE transmits a PDU session establishment request to an AMF.

Specifically, the target UE transmits a first request message to the AMF. The first request message carries a target PDU session ID, and target PDU Session Type=Unstructured, Data Network Name (DNN), S-NSSAI, N1 SM container (PDU Session Establishment Request).

The SM is session management for short, the N1 SM container refers to a protocol data unit session request cell, the PDU session establishment request included in N1 SM container refers to a protocol data unit session establishment request, and the PDU session establishment request includes a PDU session ID, requested PDU Session Type=Unstructured, target AF ID, and the unstructured data (which refers to unstructured request data herein).

In this embodiment of this disclosure, the unstructured request data may include:

UE Analytic container [Analytic ID, Analytic sub-ID, Target of Analytics Reporting=UE ID, Analytics Filter information=(IP filter information, Area of Interest), Analytics Reporting Information].

The Analytic ID refers to a target analytics identity; the Analytic sub-ID refers to a target analytics sub-identity, which is an optional parameter; the Target of Analytics Reporting refers to an analytics reporting destination address; the UE ID refers to a target UE identity, and the Analytics Filter information refers to information about an analytics filter; the IP filter information refers to Internet Protocol filter information, and may refer to address information of a FLUS sink server, that is, destination address information of to-be-transmitted streaming media, so that which target service flow the information is for may be determined; and the IP filter information may be replaced with FQDN, or may exist together with FQDN, or may include a PDU session ID (which also includes a QoS flow ID); the Area of Interest refers to information about an area of interest, that is, the network assistance information analyzed and predicted for an area to which the UE requests, which is an optional parameter; and the Analytics Reporting Information refers to information about analytics reports.

The target UE initiates a required data analytics and prediction request to the target AF by using the UE analytic container.

In this embodiment of this disclosure, the analytics reporting information may include analytics reporting information parameters, for example, an event reporting mode. A mode of reports, for example, a maximum number of reports, periodic reporting along with periodicity, and the like may be set.

In step 1.2, the AMF selects an appropriate SMF (which is referred to as a target SMF), and invokes services of the target SMF to establish a PDU session.

Specifically, the AMF transmits a second request message to the target AMF. The second request message may include a subscription permanent identifier (SUPI, and the subscription permanent identifier herein refers to a subscription permanent identifier of the target user equipment corresponding to the target user equipment identity), the DNN, the S-NSSAI, the PDU session ID, the AF ID, and the N1 SM container (PDU session establishment request).

In step 1.3, the target SMF may query a user data module (UDM) or an NF repository function (NRF), to obtain information about a target network exposure function (marked as NEF-1 in the figure, that is, a first network exposure function) which provides services for the AF ID, the DNN, and the S-NSSAI. The target SMF invokes services of the NEF-1 to establish the PDU session.

Specifically, the target SMF transmits a third request message to the NEF-1. The third request message may include the SUPI, a user identity, the PDU session ID, the AF ID, the S-NSSAI, the DNN, and the unstructured data.

In step 1.4, the NEF-1 receives the third request message transmitted by the target SMF, and may trigger non-IP data delivery (NIDD) when there is no connection established between the NEF-1 and the target AF, to configure a process to establish a connection between the NEF-1 and the target AF.

The NEF-1 may transmit parameters, for example, a generic public subscription identifier (which is referred to as GPSI for short, and herein refers to a target UE external ID obtained by converting the SUPI), the AF ID, an NEF ID (which refers to an NEF-1 identity herein) to the target AF in a NIDD configuration request.

In some embodiments, the NEF-1 may transmit the unstructured data in the NIDD configuration request. Step 1.5 is skipped when the NEF-1 transmits the unstructured data in the NIDD configuration request.

In an embodiment of FIG. 5, step 1.4 may alternatively be skipped when a NIDD configuration process has been completed in advance.

In step 1.5, the NEF-1 transmits unstructured data to the target AF.

In step 1.6, the NEF-1 transmits a PDU session establishment response message to the target SMF. The target SMF returns the PDU session establishment response message to the AMF. The AMF returns the PDU session establishment response message to the target UE.

Figure 6:
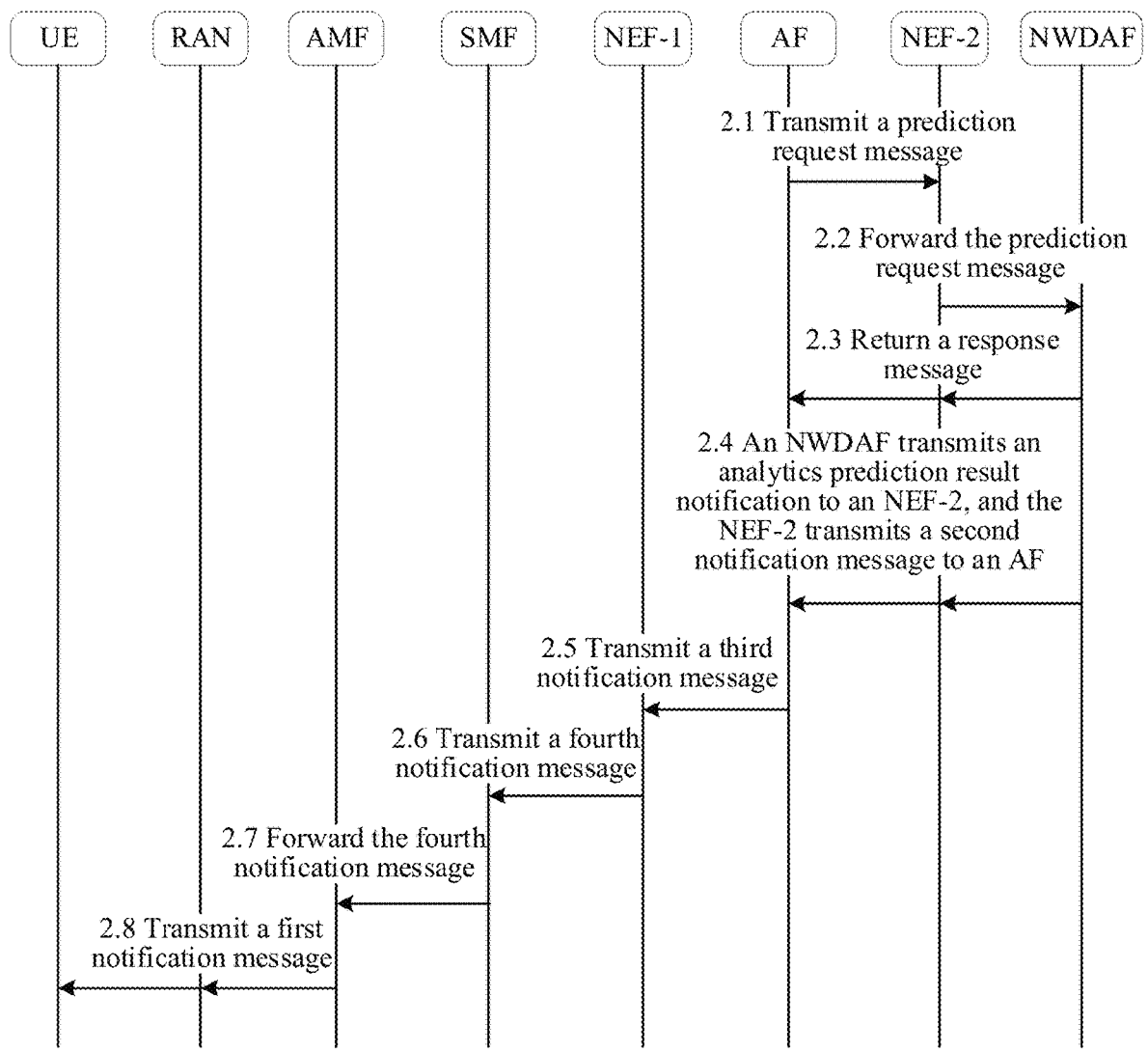
FIG. 6 is a schematic diagram of a network assistance information providing method according to still another embodiment of this disclosure.

In addition to a process 1 shown in FIG. 5, a process 2 is that the target AF subscribes to and receives a notification message including the network assistance information for the target UE. As shown in FIG. 6, the process 2 may include the following steps:

First, the target AF receives unstructured request data, and the unstructured request data includes:

UE Analytic container [Analytic ID, Analytic sub-ID, Target of Analytics Reporting=UE ID, Analytics Filter information=(IP filter information, Area of Interest), Analytics Reporting Information].

The target AF selects a second network exposure function (NEF-2) as a target NEF in the process 2 according to content of a data analytics and prediction request of the target UE. In this embodiment of this disclosure, an interaction between the target AF and a target NWDAF is independent of the PDU session establishment process in the foregoing process 1. Therefore, the NEF-2 may select an NEF the same as or different from the NEF-1, and this is not limited in this disclosure.

In step 2.1, the target AF transmits a prediction request message to the NEF-2, and the prediction request message may include: Analytic ID, Analytic sub-ID, Target of Analytics Reporting=UE ID, Analytics Filter information=(IP filter information, Area of Interest), Analytics Reporting Information.

When the target AF may be directly connected to the target NWDAF, and may also directly transmit the prediction request message to the target NWDAF, steps 2.2 and 2.3 are skipped to directly perform step 2.4.

In step 2.2, after receiving the prediction request message, the NEF-2 determines an appropriate NWDAF as a target NWDAF and transmits the prediction request message to the target NWDAF.

When the target NWDAF receives the prediction request message, a response message indicating reception is returned to the NEF-2. When the target NWDAF rejects the prediction request message, a response message indicating rejection and a value indicating a reason for rejection are returned.

In step 2.3, the NEF-2 returns a response message to the target AF, the response message including whether the prediction request message is received by the target NWDAF.

In step 2.4, the target NWDAF may determine, according to parameters in the data analytics and prediction request, which NFs are used as target network elements, receive corresponding data information from the target network elements as target data, and analyze the target data, to obtain an analytics and prediction result of a target service flow identified by the IP filter information of the target within a further time period UE to be used as the network assistance information. In addition, the target NWDAF notifies the NEF-2 of the analytics and prediction result. The analytics and prediction result includes: an analytics ID, an analytic sub-ID, analytics information, timestamp information of the prediction result, a valid time of the prediction result, a valid place of the prediction result, and a prediction confidence.

In this embodiment of this disclosure, the target NWDAF determines target network elements according to a UE analytic container corresponding to a user equipment analytics request prediction cell. For example, a PCF and/or a UPF may be determined as the target network elements according to the analytic ID and the analytic sub-ID in the UE analytic container. The NWDAF may collect data from any NF. Therefore, the NWDAF obtains the target data from the target network elements such as the PCF and the UPF, and then performs data analysis on the obtained target data, to obtain a prediction result meeting requirements as the network assistance information.

The NEF-2 transmits a second notification message to the target AF. The second notification message includes the UE analytic container (herein corresponding to the user equipment analytics response cell). The user equipment analytics response cell includes the network assistance information and the target analytics identity, and optionally includes the analytic sub-ID.

The target NWDAF may also directly transmit the notification message to the target AF when there is a direct connection between the target NWDAF and the target AF, and steps 2.2 and 2.3 are skipped.

In step 2.5, after receiving the second notification message transmitted by the NEF-2, the target AF generates unstructured response data, and then invokes services of the NEF-1 to transmit the unstructured response data to the NEF-1.

Specifically, the target AF transmits a third notification message to the NEF-1. The third notification message includes the UE ID, the AF ID, a long-term interaction reference identification (TLTRI), and the unstructured response data. The unstructured response data includes: the analytics ID, the analytic sub-ID, the analytics information, the timestamp information of the prediction result, the valid time of the prediction result, the valid place of the prediction result, and the prediction confidence in the UE analytic container.

In step 2.6, the NEF-1 invokes services of the target SMF, and transmits the unstructured response data to the target SMF.

Specifically, the NEF-1 transmits a fourth notification message to the target SMF. The fourth notification message includes: the UE ID, the PDU session ID, and the unstructured response data.

In step 2.7, the target SMF transmits the fourth notification message to the AMF.

In step 2.8, the AMF transmits a first notification message to the target UE when the target UE is in a connected state, the first notification message including the PDU session ID and the unstructured response data.

The AMF first performs paging on the target UE when the target UE is in an idle state, and then transmits the PDU session ID and the unstructured response data to the target UE after a connection between the target UE and a non-access stratum (NAS) of the AMF is established.

In this embodiment of this disclosure, the network assistance information may include: the analytics information, the timestamp information of the prediction result, the valid time of the prediction result, the valid place of the prediction result, and the prediction confidence in the UE analytic container. The analytics information may specifically be determined according to the analytics ID and the analytic sub-ID. For example, the analytics information may include a data transmission rate prediction value and/or a data packet latency prediction value of a target service flow corresponding to a target service flow identity.

In this embodiment of this disclosure, three optional setting manners of the analytics ID and the analytic sub-ID are provided as follows:
First Optional Parameter Setting Manner:
Analytic sub-ID=Service experience is added to Analytic ID=UE Analytics in step 1.1, and the analytics information in step 2.4 may specifically include at least one of a data transmission rate prediction value and a data packet latency prediction value of a target QoS flow.
Second Optional Parameter Setting Manner:
Analytic sub-ID=bitrate recommendation or/and Analytic sub-ID=latency is/are added to Analytic ID=Service experience in step 1.1, and the analytics information in step 2.4 includes content requested in the analytic sub-ID, that is, the data transmission rate prediction value or/and the data packet latency prediction value of the target QoS flow.
Third Optional Parameter Setting Manner:
Analytic sub-ID=bitrate recommendation or/and Analytic sub-ID=latency is/are added to Analytic ID=UE Analytics in step 1.1, and the analytics information in step 2.4 includes the content requested in the analytic sub-ID, that is, the data transmission rate prediction value or/and the data packet latency prediction value of the target QoS flow.

It is to be understood that, meanings represented by values of specific parameters of the analytics ID and the analytic sub-ID may be determined according to negotiation, and this is not limited to cases and names illustrated above. For example, the UE analytic container may be set to only include the analytics ID. Once the UE analytic container is received by the target NWDAF, the target NWDAF may know that the target UE requests to perform data analytics and prediction on the target user equipment. In this case, the target NWDAF may return the data transmission rate prediction value or/and the data packet latency prediction value of the predicted target QoS flow corresponding to the target analytics ID to the target UE by using the AMF.

When the UE analytic container includes both the analytics ID and the analytic sub-ID, the data transmission rate prediction value and/or the data packet latency prediction value of the predicted target QoS flow are/is returned to the target UE according to values of the analytics ID and the analytic sub-ID.

Figure 7:
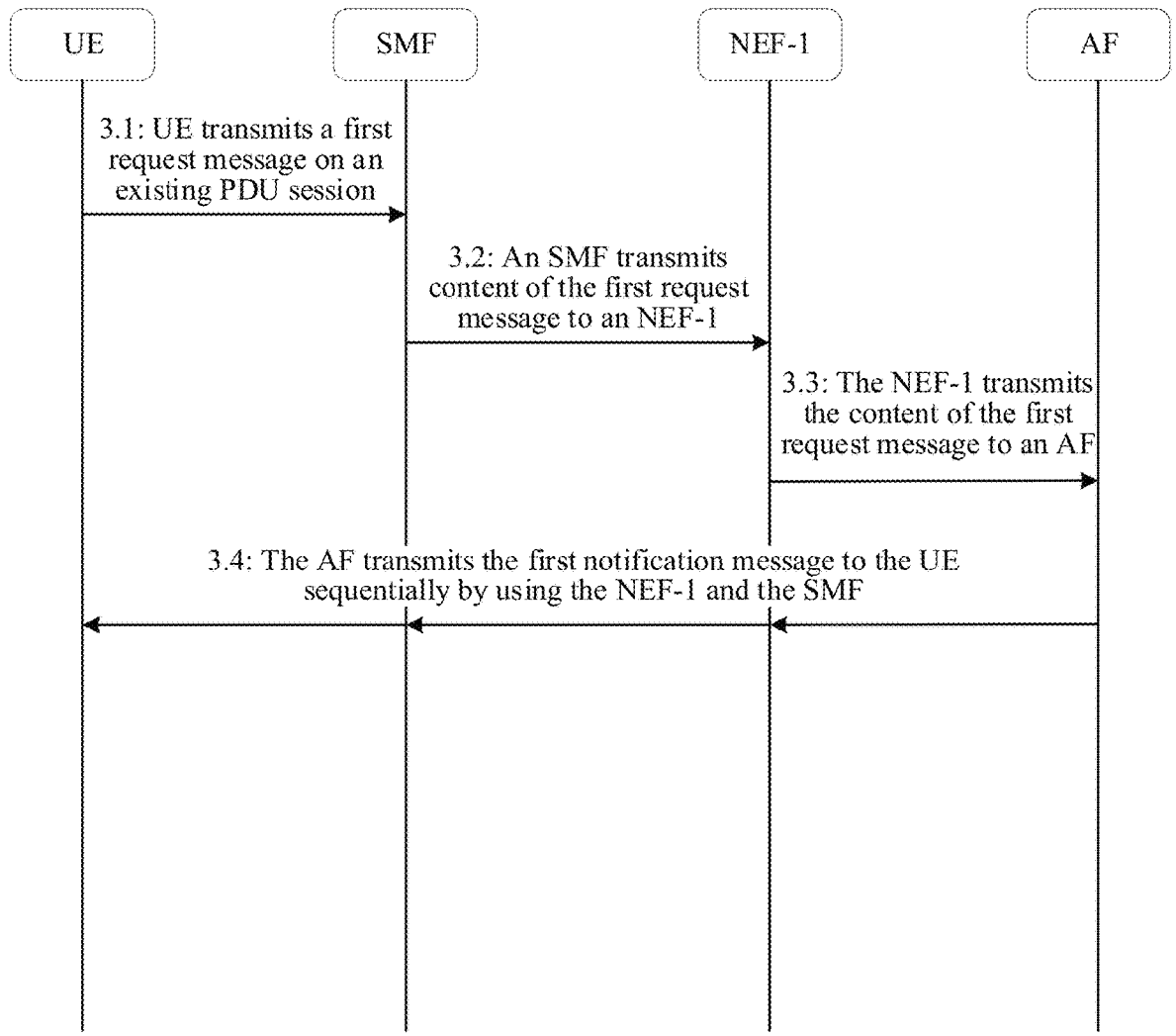
FIG. 7 is a schematic diagram of a network assistance information providing method according to yet another embodiment of this disclosure.

In the embodiment of FIG. 5, the UE carries the unstructured data in the PDU session establishment process. In the embodiment of FIG. 7, the data analytics and prediction request of the target UE may alternatively be transmitted after the PDU session is established. A specific service flowchart is shown in FIG. 7. As shown in FIG. 7, the following steps are included:

In step 3.1, the target UE transmits a first request message to the target SMF on an existing PDU session.

Specifically, the target UE transmits the first request message to the target SMF. The first request message carries the PDU session ID and the unstructured data (herein specifically corresponding to the unstructured request data).

In this embodiment of this disclosure, the unstructured request data may include: UE Analytic container [Analytic ID, Analytic sub-ID (which is an optional parameter), Target of Analytics Reporting=UE ID, Analytics Filter information=(IP filter information, Area of Interest), Analytics Reporting Information].

In step 3.2, the target SMF transmits content of the first request message to the NEF-1.

Specifically, the target SMF transmits a fourth request message to the NEF-1. The fourth request message may include a user identity (herein referring to a user identity of the target user equipment corresponding to the target user equipment identity), the PDU session ID, and the unstructured request data.

In step 3.3, the NEF-1 transmits the content of the first request message to the target AF.

Specifically, the NEF-1 transmits a fifth request message to the target AF. The fifth request message may include an external identity of the target UE, the PDU session ID, and the unstructured request data.

In step 3.4, the target AF transmits the first notification message to the target UE sequentially by using the NEF-1 and the SMF.

Specifically, the target AF transmits a fifth notification message to the NEF-1. The fifth notification message may include the target user equipment identity, the PDU session ID, and the unstructured response data.

The NEF-1 may transmit a sixth notification message to the SMF after receiving the fifth notification message. The sixth notification message may include the target user equipment identity, the PDU session ID, and the unstructured response data.

The SMF may transmit the first notification message to the target UE after receiving the fifth notification message. The first notification message includes the PDU session ID and the unstructured response data.

An embodiment of this disclosure provides a network assistance information providing method, to transmit service information data (e.g., the network assistance information) predicted by an NWDAF to a FLUS source. In other words, a method in which an AF is used as a NAssS to provide the predicted service information data to the FLUS source is provided, which expands a range of the assistance information. Compared with the related technology, in addition to returning a data transmission rate prediction value (including bitrate recommendation) of a target service flow corresponding to a target service flow identity, the AF may alternatively return a data packet latency prediction value of the target service flow. After receiving the returned network assistance information, the target UE may assist in performing optimization processing such as setting a streaming media transmission rate, setting a size of an output/input buffer, and matching encoding and decoding algorithms.

Figure 8:
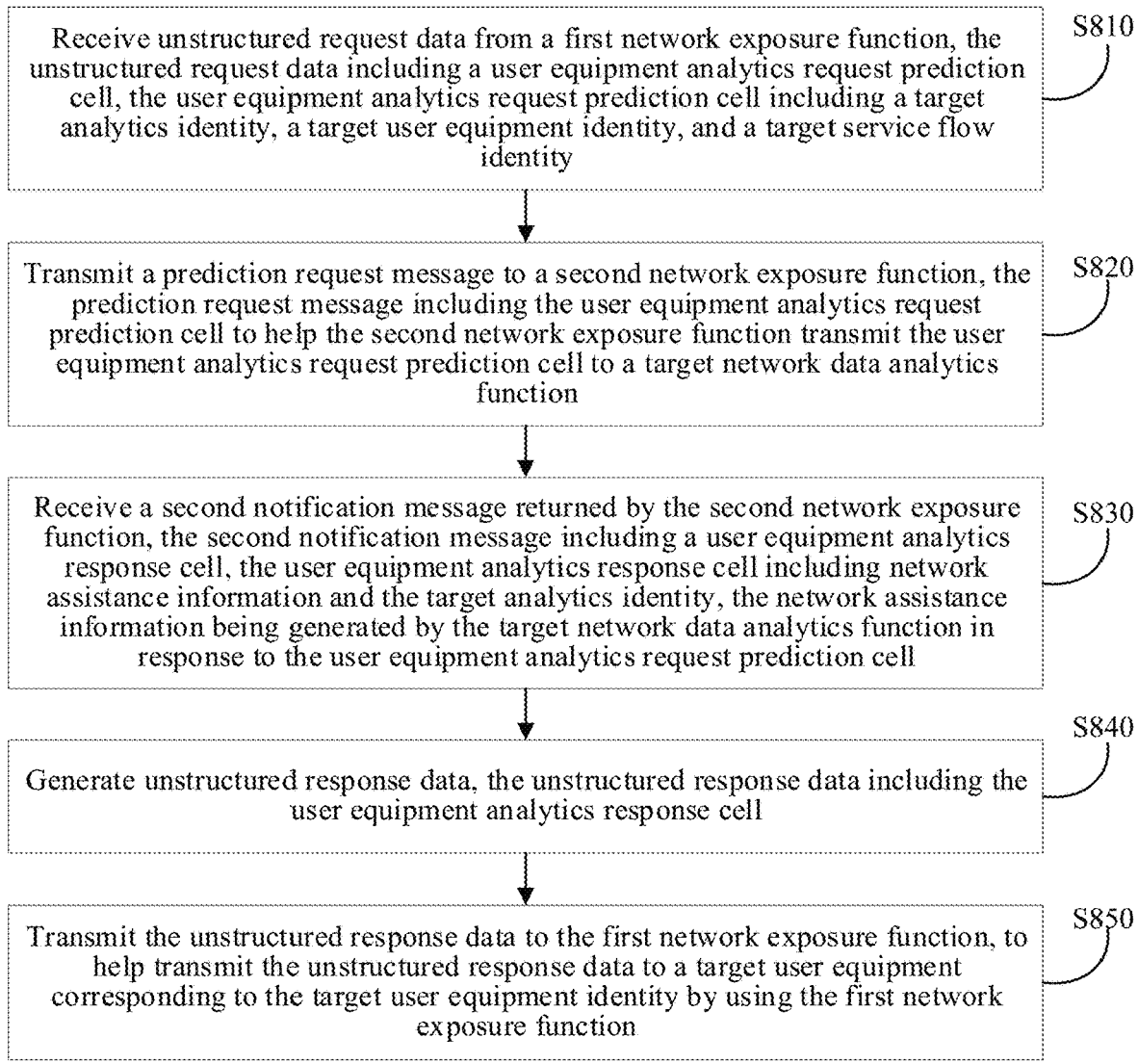
FIG. 8 is a schematic flowchart of a network assistance information providing method according to another embodiment of this disclosure.

FIG. 8 is a schematic flowchart of a network assistance information providing method according to an embodiment of this disclosure. In an embodiment of FIG. 8, the method may be implemented by an electronic device used as the target AF, for example, the server 104 shown in FIG. 1, and this is not limited in this disclosure. As shown in FIG. 8, the method provided in this embodiment of this disclosure may include the following steps:

In step S810, receive unstructured request data from a first network exposure function, the unstructured request data including a user equipment analytics request prediction cell, the user equipment analytics request prediction cell including a target analytics identity and a target user equipment identity.

In step S820, transmit a prediction request message to a second network exposure function, the prediction request message including the user equipment analytics request prediction cell to help the second network exposure function transmit the user equipment analytics request prediction cell to a target network data analytics function.

In step S830, receive a second notification message returned by the second network exposure function, the second notification message including a user equipment analytics response cell, the user equipment analytics response cell including network assistance information and the target analytics identity, the network assistance information being generated by the target network data analytics function in response to the user equipment analytics request prediction cell.

In step S840, generate unstructured response data, the unstructured response data including the user equipment analytics response cell.

In step S850, transmit the unstructured response data to the first network exposure function, to help transmit the unstructured response data to target user equipment corresponding to the target user equipment identity by using the first network exposure function.

In an exemplary embodiment, the transmitting the unstructured response data to the first network exposure function, to help transmit the unstructured response data to target user equipment corresponding to the target user equipment identity by using the first network exposure function may include: transmitting a third notification message to the first network exposure function, the third notification message including the target user equipment identity, a target protocol data unit session identity, and the unstructured response data; transmitting, by using the first network exposure function, a fourth notification message to a target session management function, the fourth notification message including the target user equipment identity, the target protocol data unit session identity, and the unstructured response data; transmitting, by using the target session management function, the fourth notification message to an access and mobility management function; and transmitting, by using the access and mobility management function, a first notification message to the target user equipment, the first notification message including the target protocol data unit session identity and the unstructured response data.

In an exemplary embodiment, the transmitting the unstructured response data to the first network exposure function, to help transmit the unstructured response data to target user equipment corresponding to the target user equipment identity by using the first network exposure function may include: transmitting a fifth notification message to the first network exposure function, the fifth notification message including the target user equipment identity, a target protocol data unit session identity, and the unstructured response data; transmitting, by using the first network exposure function, a sixth notification message to a target session management function, the sixth notification message including the target user equipment identity, the target protocol data unit session identity, and the unstructured response data; and transmitting, by using the target session management function, a first notification message to the target user equipment, the first notification message including the target protocol data unit session identity and the unstructured response data.

Figure 9:
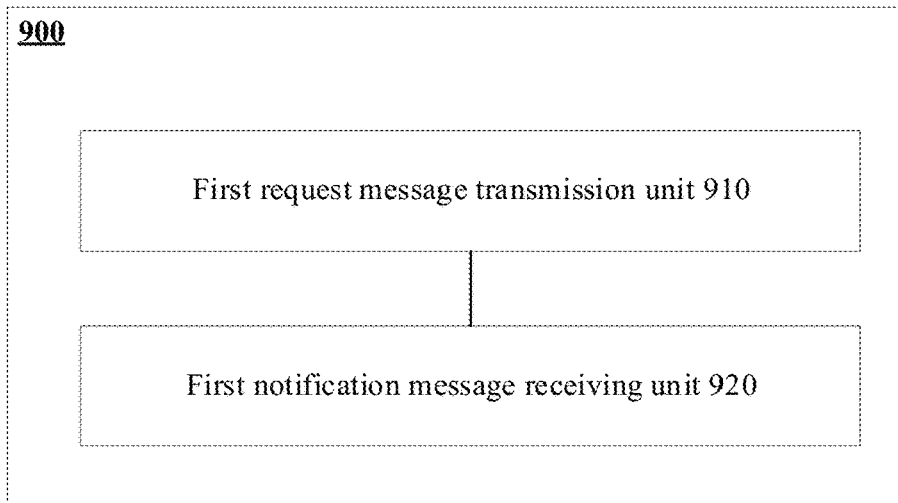
FIG. 9 is a schematic block diagram of a network assistance information providing apparatus according to an embodiment of this disclosure.

FIG. 9 is a schematic block diagram of a network assistance information providing apparatus according to an embodiment of this disclosure. As shown in FIG. 9, a network assistance information providing apparatus 900 provided in an implementation of this disclosure may include a first request message transmission unit 910 and a first notification message receiving unit 920. One or more units of the apparatus can be implemented by processing circuitry, software, or a combination thereof, for example.

The first request message transmission unit 910 may be configured to transmit a first request message, the first request message carrying a target protocol data unit session identity and unstructured request data, the unstructured request data including a user equipment analytics request prediction cell, the user equipment analytics request prediction cell including a target analytics identity to help transmit the unstructured request data to a target application function corresponding to the target protocol data unit session identity, the target application function transmitting the user equipment analytics request prediction cell to a target network data analytics function. The first notification message receiving unit 920 may be configured to receive a first notification message, the first notification message carrying the target protocol data unit session identity and unstructured response data, the unstructured response data including a user equipment analytics response cell, the user equipment analytics response cell including network assistance information and the target analytics identity, the network assistance information being generated by the target network data analytics function in response to the user equipment analytics request prediction cell.

In an exemplary embodiment, the user equipment analytics request prediction cell further includes a target user equipment identity, and the first request message transmission unit 910 may include: a first request message delivering unit, configured to put the first request message in a target protocol data unit session establishment request message, and transmit the target protocol data unit session establishment request message to an access and mobility management function; a second request message transmission unit, configured to transmit, by using the access and mobility management function, a second request message to a target session management function, the second request message including a subscription permanent identifier of target user equipment corresponding to the target user equipment identity, the target protocol data unit session identity, and the unstructured request data; a third request message transmission unit, configured to transmit, by using the target session management function, a third request message to a first network exposure function, the third request message including the subscription permanent identifier, the target protocol data unit session identity, and the unstructured request data; and an unstructured request data transmission unit, configured to transmit, by using the first network exposure function, the unstructured request data to the target application function.

In an exemplary embodiment, the first request message transmission unit 910 may include: a first request message delivery unit, configured to transmit the first request message to a target session management function on a target protocol data unit session corresponding to the target protocol data unit session identity; a fourth request message transmission unit, configured to transmit, by using the target session management function, a fourth request message to a first network exposure function, the fourth request message including the target protocol data unit session identity and the unstructured request data; and a fifth request message transmission unit, configured to transmit, by using the first network exposure function, a fifth request message to the target application function, the fifth request message including the target protocol data unit session identity and the unstructured request data.

In an exemplary embodiment, the user equipment analytics request prediction cell further includes a target service flow identity, and the network assistance information may include a data transmission rate prediction value of a target service flow corresponding to the target service flow identity.

In an exemplary embodiment, the user equipment analytics request prediction cell further includes a target service flow identity, and the network assistance information may include a data packet latency prediction value of a target service flow corresponding to the target service flow identity.

In an exemplary embodiment, the user equipment analytics request prediction cell may further include a target analytics sub-identity, and the network assistance information is determined according to the target analytics identity and the target analytics sub-identity.

In an exemplary embodiment, the user equipment analytics request prediction cell further includes a target service flow identity, and the network assistance information may include at least one of a data transmission rate prediction value and a data packet latency prediction value of a target service flow corresponding to the target service flow identity when the target analytics identity is set as user equipment analytics, and the target analytics sub-identity is set as service experience.

In an exemplary embodiment, the user equipment analytics request prediction cell further includes a target service flow identity, and the network assistance information may include a data transmission rate prediction value of a target service flow corresponding to the target service flow identity when the target analytics identity is set as service experience or user equipment analytics, and the target analytics sub-identity is set as bitrate recommendation.

In an exemplary embodiment, the user equipment analytics request prediction cell further includes a target service flow identity, and the network assistance information may include a data packet latency prediction value of a target service flow corresponding to the target service flow identity when the target analytics identity is set as service experience or user equipment analytics, and the target analytics sub-identity is set as a latency.

In an exemplary embodiment, the user equipment analytics request prediction cell further includes a target service flow identity, and the network assistance information may include a data transmission rate prediction value and a data packet latency prediction value of a target service flow corresponding to the target service flow identity when the target analytics identity is set as service experience or user equipment analytics, and the target analytics sub-identity is set as bitrate recommendation and a latency.

In an exemplary embodiment, the user equipment analytics request prediction cell further includes a target service flow identity, and the target service flow identity may include Internet Protocol filter information and/or a fully qualified domain name.

In an exemplary embodiment, the user equipment analytics request prediction cell may further include information about an area of interest.

In an exemplary embodiment, the user equipment analytics response cell may further include one or more of timestamp information, a valid time, a valid place, or a prediction confidence of the network assistance information.

For exemplary implementations of the units in the network assistance information providing apparatus provided in this embodiment of this disclosure, reference may be made to the content in the network assistance information providing method, and details are not described herein again.

Figure 10:
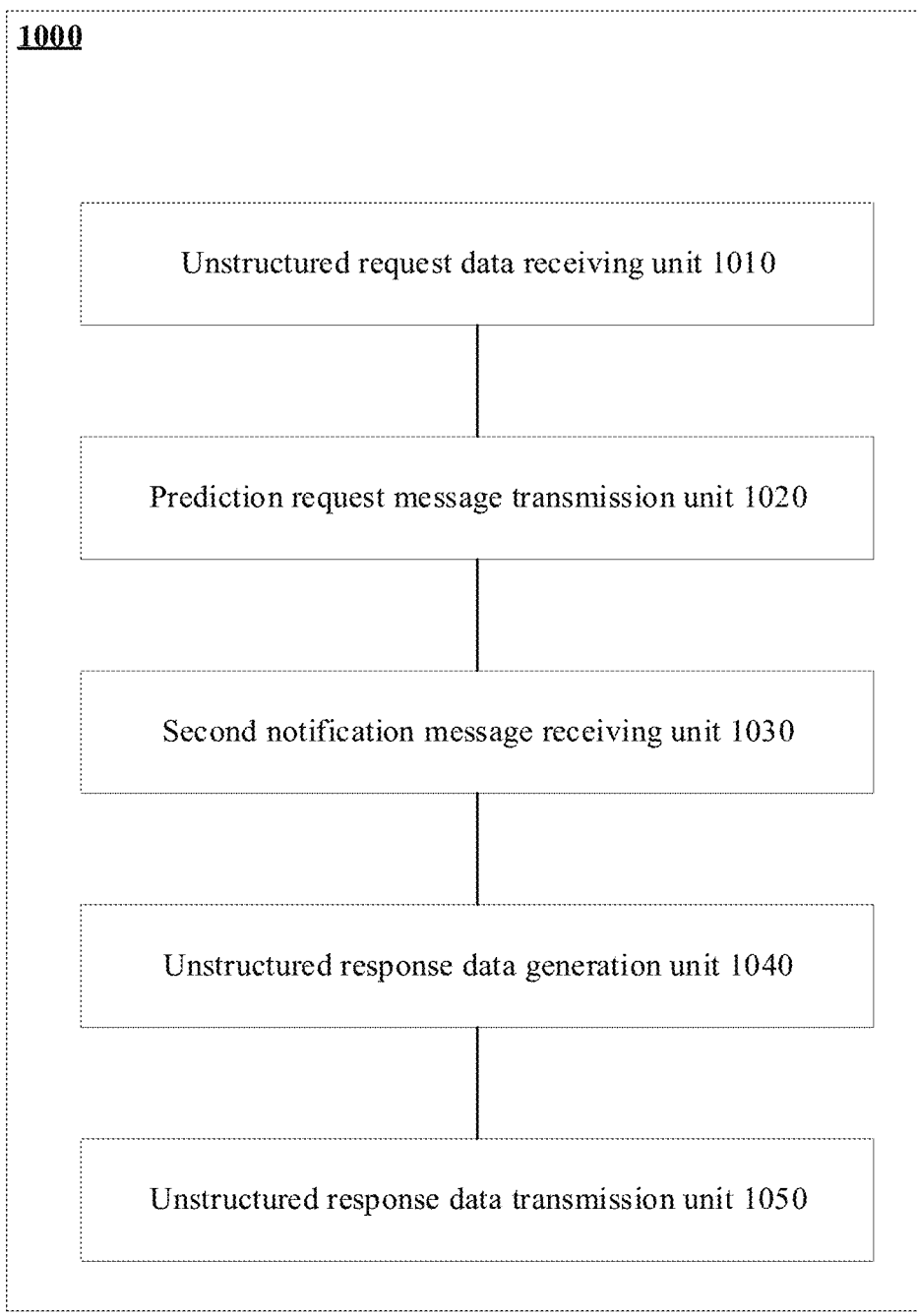
FIG. 10 is a schematic block diagram of a network assistance information providing apparatus according to another embodiment of this disclosure.

FIG. 10 is a schematic block diagram of a network assistance information providing apparatus according to an embodiment of this disclosure. As shown in FIG. 10, a network assistance information providing apparatus 1000 provided in this implementation of this disclosure may include: an unstructured request data receiving unit 1010, a prediction request message transmission unit 1020, a second notification message receiving unit 1030, an unstructured response data generation unit 1040, and an unstructured response data transmission unit 1050. One or more units of the apparatus can be implemented by processing circuitry, software, or a combination thereof, for example.

The unstructured request data receiving unit 1010 may be configured to receive unstructured request data from a first network exposure function, the unstructured request data including a user equipment analytics request prediction cell, the user equipment analytics request prediction cell including a target analytics identity and a target user equipment identity. The prediction request message transmission unit 1020 may be configured to transmit a prediction request message to a second network exposure function, the prediction request message including the user equipment analytics request prediction cell to help the second network exposure function transmit the user equipment analytics request prediction cell to a target network data analytics function. The second notification message receiving unit 1030 may be configured to receive a second notification message returned by the second network exposure function, the second notification message including a user equipment analytics response cell, the user equipment analytics response cell including network assistance information and the target analytics identity, the network assistance information being generated by the target network data analytics function in response to the user equipment analytics request prediction cell. The unstructured response data generation unit 1040 may be configured to generate unstructured response data, the unstructured response data including the user equipment analytics response cell. The unstructured response data transmission unit 1050 may be configured to transmit the unstructured response data to the first network exposure function, to help transmit the unstructured response data to target user equipment corresponding to the target user equipment identity by using the first network exposure function.

In an exemplary embodiment, the unstructured response data transmission unit 1050 may include: a third notification message transmission unit, configured to transmit a third notification message to the first network exposure function, the third notification message including the target user equipment identity, a target protocol data unit session identity, and the unstructured response data; a fourth notification message transmission unit, configured to transmit, by using the first network exposure function, a fourth notification message to a target session management function, the fourth notification message including the target user equipment identity, the target protocol data unit session identity, and the unstructured response data; a fourth notification message forwarding unit, configured to transmit, by using the target session management function, the fourth notification message to an access and mobility management function; and a first notification message delivery unit, configured to transmit, by using the access and mobility management function, a first notification message to the target user equipment, the first notification message including the target protocol data unit session identity and the unstructured response data.

In an exemplary embodiment, the unstructured response data transmission unit 1050 may include: a fifth notification message transmission unit, configured to transmit a fifth notification message to the first network exposure function, the fifth notification message including the target user equipment identity, a target protocol data unit session identity, and the unstructured response data; a sixth notification message transmission unit, configured to transmit, by using the first network exposure function, a sixth notification message to a target session management function, the sixth notification message including the target user equipment identity, the target protocol data unit session identity, and the unstructured response data; and a first notification message transmission unit, configured to transmit, by using the target session management function, a first notification message to the target user equipment, the first notification message including the target protocol data unit session identity and the unstructured response data.

For exemplary implementations of the units in the network assistance information providing apparatus provided in this embodiment of this disclosure, reference may be made to the content in the network assistance information providing method, and details are not described herein again.

Although a plurality of units of a device configured to perform actions are described in the foregoing detailed descriptions, such division is not mandatory. According to the implementations of this disclosure, features and functions of two or more units described above may be specified in one unit. On the contrary, the features or functions of one unit described above may further be divided and specified by a plurality of units.

According to the foregoing descriptions of the implementations, a person skilled in the art should understand that the exemplary implementations described herein may be implemented by using software, or may be implemented by combining software and hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

This disclosure is intended to cover any variations, uses, or adaptive changes of this disclosure. These variations, uses, or adaptive changes may follow the general principles of this disclosure and include common general knowledge or common technical means in the art, which are not disclosed in this disclosure. This specification and the embodiments are considered as merely exemplary.

It is to be understood that this disclosure is not limited to the precise structures described above and shown in the accompanying drawings, and various modifications and changes may be made without departing from the scope of this disclosure.

What is claimed is:

1. A network assistance information providing method, comprising:
    transmitting, by processing circuitry, a target protocol data unit session establishment request message to an access and mobility management function, the target protocol data unit session establishment request message including a first request message that includes a target protocol data unit session identity and unstructured request data, the unstructured request data including a user equipment analytics request prediction cell, the unstructured request data being transmitted to a target application function corresponding to the target protocol data unit session identity based on a target analytics identity included in the user equipment analytics request prediction cell, the target application function being configured to transmit the user equipment analytics request prediction cell to a target network data analytics function, the user equipment analytics request prediction cell including a target user equipment identity; and receiving a first notification message that includes the target protocol data unit session identity and unstructured response data, the unstructured response data including a user equipment analytics response cell, the user equipment analytics response cell including network assistance information and the target analytics identity, the network assistance information being generated by the target network data analytics function in response to the user equipment analytics request prediction cell, wherein a second request message is transmitted, via the access and mobility management function, to a target session management function, the second request message including a subscription permanent identifier of target user equipment corresponding to the target user equipment identity, the target protocol data unit session identity, and the unstructured request data;

a third request message is transmitted, via the target session management function, to a first network exposure function the third request message including the subscription permanent identifier, the target protocol data unit session identity, and the unstructured request data; and the unstructured request data is transmitted, via the first network exposure function, to the target application function.

2. The network assistance information providing method according to claim 1, further comprising:

transmitting, via the access and mobility management function, the second request message to the target session management function, the second request message including the subscription permanent identifier of the target user equipment corresponding to the target user equipment identity, the target protocol data unit session identity, and the unstructured request data;

transmitting, via the target session management function, the third request message to the first network exposure function, the third request message including the subscription permanent identifier, the target protocol data unit session identity, and the unstructured request data; and transmitting, via the first network exposure function, the unstructured request data to the target application function.

3. The network assistance information providing method according to claim 1, further comprising:

transmitting a fourth request message to the target session management function on a target protocol data unit session corresponding to the target protocol data unit session identity;

transmitting, via the target session management function, a fifth request message to the first network exposure function, the fifth request message including the target protocol data unit session identity and the unstructured request data; and transmitting, via the first network exposure function, a sixth request message to the target application function, the sixth request message including the target protocol data unit session identity and the unstructured request data.

4. The network assistance information providing method according to claim 1, wherein the user equipment analytics request prediction cell includes a target service flow identity, and the network assistance information includes a data transmission rate prediction value of a target service flow corresponding to the target service flow identity.

5. The network assistance information providing method according to claim 1, wherein the user equipment analytics request prediction cell includes a target service flow identity, and the network assistance information includes a data packet latency prediction value of a target service flow corresponding to the target service flow identity.

6. The network assistance information providing method according to claim 1, wherein the user equipment analytics request prediction cell includes a target analytics sub-identity, and the network assistance information is determined according to the target analytics identity and the target analytics sub-identity.

7. The network assistance information providing method according to claim 6, wherein the user equipment analytics request prediction cell includes a target service flow identity, and the network assistance information includes at least one of a data transmission rate prediction value and a data packet latency prediction value of a target service flow corresponding to the target service flow identity when the target analytics identity is set as user equipment analytics, and the target analytics sub-identity is set as service experience.

8. The network assistance information providing method according to claim 6, wherein the user equipment analytics request prediction cell includes a target service flow identity, and the network assistance information includes a data transmission rate prediction value of a target service flow corresponding to the target service flow identity when the target analytics identity is set as service experience or user equipment analytics, and the target analytics sub-identity is set as bitrate recommendation.

9. The network assistance information providing method according to claim 6, wherein the user equipment analytics request prediction cell includes a target service flow identity, and the network assistance information includes a data packet latency prediction value of a target service flow corresponding to the target service flow identity when the target analytics identity is set as service experience or user equipment analytics, and the target analytics sub-identity is set as a latency.

10. The network assistance information providing method according to claim 6, wherein the user equipment analytics request prediction cell includes a target service flow identity, and the network assistance information includes a data transmission rate prediction value and a data packet latency prediction value of a target service flow corresponding to the target service flow identity when the target analytics identity is set as service experience or user equipment analytics, and the target analytics sub-identity is set as bitrate recommendation and a latency.

11. The network assistance information providing method according to claim 1, wherein the user equipment analytics request prediction cell includes a target service flow identity, the target service flow identity including at least one of Internet Protocol filter information or a fully qualified domain name.

12. The network assistance information providing method according to claim 1, wherein the user equipment analytics request prediction cell indicates an area of interest.

13. The network assistance information providing method according to claim 1, wherein the user equipment analytics response cell includes one or more of timestamp information, a valid time, a valid place, or a prediction confidence of the network assistance information.

14. A network assistance information providing method, comprising:
- receiving unstructured request data from a first network exposure function, the unstructured request data including a user equipment analytics request prediction cell, the user equipment analytics request prediction cell including a target analytics identity and a target user equipment identity;
- transmitting a prediction request message to a second network exposure function, the prediction request message including the user equipment analytics request prediction cell;
- receiving a second notification message from the second network exposure function that includes a user equipment analytics response cell, the user equipment analytics response cell including network assistance information and the target analytics identity, the network assistance information being generated by a target network data analytics function in response to the user equipment analytics request prediction cell;
- generating, by processing circuitry, unstructured response data that includes the user equipment analytics response cell; and
- transmitting the unstructured response data via the first network exposure function to target user equipment corresponding to the target user equipment identity.

15. The network assistance information providing method according to claim 14, wherein the transmitting the unstructured response data via the first network exposure function comprises:
- transmitting a third notification message to the first network exposure function, the third notification message including the target user equipment identity, a target protocol data unit session identity, and the unstructured response data;
- transmitting, via the first network exposure function, a fourth notification message to a target session management function, the fourth notification message including the target user equipment identity, the target protocol data unit session identity, and the unstructured response data;
- transmitting, via the target session management function, the fourth notification message to an access and mobility management function; and
- transmitting, via the access and mobility management function, a first notification message to the target user equipment, the first notification message including the target protocol data unit session identity and the unstructured response data.

16. The network assistance information providing method according to claim 14, wherein the transmitting the unstructured response data via the first network exposure function comprises:
- transmitting a fifth notification message to the first network exposure function, the fifth notification message including the target user equipment identity, a target protocol data unit session identity, and the unstructured response data;
- transmitting, via the first network exposure function, a sixth notification message to a target session management function, the sixth notification message including the target user equipment identity, the target protocol data unit session identity, and the unstructured response data; and
- transmitting, via the target session management function, a first notification message to the target user equipment, the first notification message including the target protocol data unit session identity and the unstructured response data.

17. A network assistance information providing apparatus, comprising:
processing circuitry configured to:
- transmit a target protocol data unit session establishment request message to an access and mobility management function, the target protocol data unit session establishment request message including a first request message that includes a target protocol data unit session identity and unstructured request data, the unstructured request data including a user equipment analytics request prediction cell, the unstructured request data being transmitted to a target application function corresponding to the target protocol data unit session identity based on a target analytics identity included in the user equipment analytics request prediction cell, the target application function being configured to transmit the user equipment analytics request prediction cell to a target network data analytics function, the user equipment analytics request prediction cell including a target user equipment identity; and
- receive a first notification message that includes the target protocol data unit session identity and unstructured response data, the unstructured response data including a user equipment analytics response cell, the user equipment analytics response cell including network assistance information and the target analytics identity, the network assistance information being generated by the target network data analytics function in response to the user equipment analytics request prediction cell, wherein
- a second request message is transmitted, via the access and mobility management function, to a target session management function, the second request message including a subscription permanent identifier of target user equipment corresponding to the target user equipment identity, the target protocol data unit session identity, and the unstructured request data;
- a third request message is transmitted, via the target session management function, to a first network exposure function the third request message including the subscription permanent identifier, the target protocol data unit session identity, and the unstructured request data; and
- the unstructured request data is transmitted, via the first network exposure function, to the target application function.

18. The network assistance information providing apparatus according to claim 17, wherein the processing circuitry is configured to:
- transmit, via the access and mobility management function, the second request message to the target session management function, the second request message including the subscription permanent identifier of the target user equipment corresponding to the target user equipment identity, the target protocol data unit session identity, and the unstructured request data;

transmit, via the target session management function, the third request message to the first network exposure function, the third request message including the subscription permanent identifier, the target protocol data unit session identity, and the unstructured request data; and transmit, via the first network exposure function, the unstructured request data to the target application function.

19. A non-transitory computer-readable storage medium, storing instructions which when executed by the processing circuitry cause the processing circuitry to perform the network assistance information providing method according to claim 1.

20. A non-transitory computer-readable storage medium, storing instructions which when executed by the processing circuitry cause the processing circuitry to perform the network assistance information providing method according to claim 14.

* * * * *